United States Patent
Motoyama et al.

(10) Patent No.: US 7,542,846 B2
(45) Date of Patent: Jun. 2, 2009

(54) NAVIGATION SYSTEM UTILIZING XML/SVG MAP DATA CONVERTED FROM GEOGRAPHIC MAP DATA AND LAYERED STRUCTURE OF XML/SVG MAP DATA BASED ON ADMINISTRATIVE REGIONS

(75) Inventors: Masaki Motoyama, Torrance, CA (US); Hirohisa Yamaguchi, Mission Viejo, CA (US)

(73) Assignees: Alpine Electronics, Inc., Tokyo (JP); Skill Sets Alliance, Inc. CA (US)

( * ) Notice: Subject to any disclaimer, the term of this patent is extended or adjusted under 35 U.S.C. 154(b) by 482 days.

(21) Appl. No.: 11/348,821

(22) Filed: Feb. 7, 2006

(65) Prior Publication Data

US 2007/0185651 A1 Aug. 9, 2007

(51) Int. Cl.
*G01C 21/32* (2006.01)
*G06F 19/00* (2006.01)

(52) U.S. Cl. ................ 701/208; 701/211; 340/995.1
(58) Field of Classification Search ............. 701/200, 701/201, 208, 211; 340/995.1; 715/848, 715/760, 513, 700; 382/190; 358/1.15, 3.28
See application file for complete search history.

(56) References Cited

U.S. PATENT DOCUMENTS

| | | | |
|---|---|---|---|
| 5,968,109 A | 10/1999 | Israni et al. | |
| 7,076,505 B2* | 7/2006 | Campbell | 707/104.1 |
| 7,158,878 B2* | 1/2007 | Rasmussen et al. | 701/208 |
| 7,180,527 B2* | 2/2007 | Sakai et al. | 345/629 |
| 7,325,187 B2* | 1/2008 | Yashiro | 715/249 |
| 2005/0034062 A1* | 2/2005 | Bufkin et al. | 715/512 |
| 2005/0035883 A1 | 2/2005 | Kameda et al. | |
| 2006/0031749 A1* | 2/2006 | Schramm et al. | 715/500.1 |
| 2006/0170693 A1* | 8/2006 | Bethune et al. | 345/568 |
| 2008/0134019 A1* | 6/2008 | Wake et al. | 715/239 |

FOREIGN PATENT DOCUMENTS

| | | |
|---|---|---|
| JP | 05-94133 | 4/1993 |
| JP | 2003-330968 | 11/2003 |

\* cited by examiner

*Primary Examiner*—Tan Q Nguyen
(74) *Attorney, Agent, or Firm*—Muramatsu & Associates

(57) ABSTRACT

A navigation system uses XML/SVG format map data for achieving flexibility in modifying the map data. A method of converting geographic data into the XML/SVG format map data includes the steps of retrieving the geographic data, analyzing the retrieved geographic data for its data elements structure, data type and semantics, and converting the analyzed data to the XML/SVG format map data for use with the navigation system. The XML/SVG format map data is constructed in a layered structure created based on administrative regions such as states, counties and cities. The XML/SVG format map data can be delivered to a remote user as a unit of administrative region through a communication network.

18 Claims, 19 Drawing Sheets

Fig. 6

| Description | GDF Attribute Code | XML-SVG element |
|---|---|---|
| Direction of Traffic Flow | DF | DF |
| Vehicle Type | VT | VT |
| Through Traffic | 23 | TRT |
| Form of way | FW | FW |
| Function Class | FC | FC |
| Speed Category | @I | SC |
| Lane Category | @N | LC |
| Average Speed | AS | AS |
| Detailed City | 17 | DCI |
| Full Geometry | 27 | FG |
| Prefix of Street Name | !P | SPR |
| Type of Street Name | !T | STT |
| House Number Struct | HS | HS |
| Address scheme left | @L | ASL |
| Address format left | @8 | AFL |

Fig. 9A
Geographic data
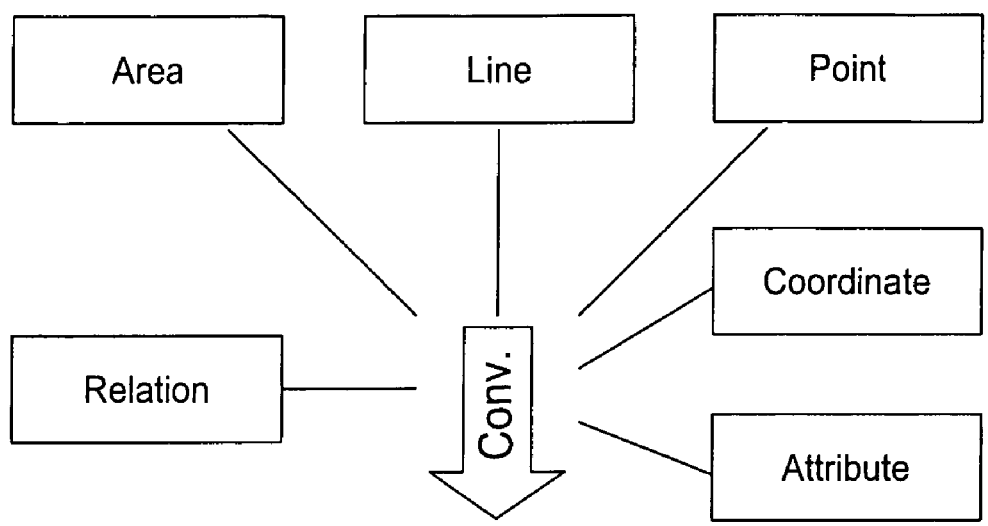
SVG
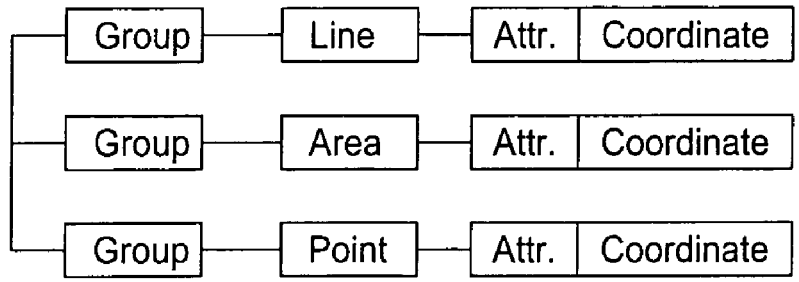

Fig. 9B

| Main Map Element | Data | SVG | XML |
|---|---|---|---|
| Road Link | ID Number | ○ | ○ |
| | Shape Point (Coordinate) | ○ | |
| | Node Information | | ○ |
| | Name | | ○ |
| | Address | | ○ |
| | Road Class | ○ | ○ |
| | Traffic Regulation | | ○ |
| | Vehicle Type | | ○ |
| | Other | | ○ |
| Polygon (Park, Building, etc) | ID Number | ○ | ○ |
| | Shape Point (Coordinate) | ○ | |
| | Name | | ○ |
| | Attribute Information | | ○ |
| | Other | | ○ |
| POI | ID Number | ○ | ○ |
| | Location | ○ | ○ |
| | Category | ○ | ○ |
| | Name | | ○ |
| | Address, Telephone | | ○ |
| | Attribute Information | | ○ |

Fig. 10A

```xml
<XMLLine xmlns:xsi="http://www.w3.org/2001/XMLSchema-instance" xsi:noNamespaceSchemaLocation= "C:\ temp\ 04-11-2005\ U.xsd">
  <FC CODE="4110" SUB CAT="FourthClassRoad">
    <Line ID="137622" FROM ="1222291" TO="1226916">
      <Edge ID="21542884" DIR="1" />
      <SegAttr ID="94520">
        <DF>3</DF>
        < VT> 1 </VT>
        <TRT> 1 </TRT>
      </SegAttr>
      <SegAttr ID="337231">
        <FW>3</FW>
        <FC>4</FC>
        <SC>6</SC>
        <LC>1</LC>
        <AS>40</AS>
        <DCI>1</DCI>
        <FG>1</FG>
      </SegAttr>
      <SegAttr ID="337232">
        <SPP>W</SPP>
        <SPR>ENGW</SPR>
        <STT>ENGFUST</STT>
        <HS>3</HS>
        <ASL>E</ASL>
        <AFL> N </AFL>
        <ASR>O</ASR>
        <AFR>N</AFR>
        <AT> B</AT>
      <ON>W 84TH ST</ON>
        <SBN>84TH</SBN>
        <LS> 100</LS>
        <LE>198</LE>
        <RS>101</RS>
        <RE>199</RE>
      </SegAttr>
```

Fig. 10B

```xml
            <Builtup>11109</Builtup>
             <Named> 12767</Named >
        </Line>
        <Line ID="137660" FROM=" 1206511" TO="1208981">
          <Edge ID="21542922" DIR="1" />
          <SegAttr ID="94524">
            <DF>1</DF>
           < VT> 1 </VT>
           <TRT> 1</TRT>
          </SegAttr>
          <SegAttr ID="337439">
            <FW>3</FW>
          <FC>4</FC>
           <SC>6</SC>
           <LC>1</LC>
            <AS>40</AS>
            <DCI>1</DCI>
            <FG>1</FG>
          </SegAttr>
        <SegAttr ID="337440">
            <SPP>E</SPP>
            <SPR>ENGE</SPR>
            <STT>ENGFUST</STT>
            <HS>3</HS>
            <ASL>E</ASL>
            <AFL>N</AFL>
            <ASR>O</ASR>
            <AFR>N</AFR>
          <AT> B</AT>
            <ON>E 86TH ST</ON>
            <SBN>86TH</SBN>
            <LS>46</LS>
            <LE>2</LE>
            <RS>47</RS>
            <RE>1</RE>
          </SegAttr>
          <Builtup>11109</Builtup>
          <Named>12767</Named>
       </Line>
     </FC>
  </XMLLine>
```

Fig. 11

```
<?xml version='1.0' standalone='no'?>
<!DOCTYPE svg [
  <!ENTITY textStyle 'font-family:"Times New Roman";fill:black;stroke:black;visibility:hidden'>
  <!ENTITY pointStyle 'fill:red;stroke:yellow;stroke-width:0.001;'> <!ENTITY lineStyle 'fill:none;stroke:darkgoldenrod;strokewidth:0.002;'>
  <!ENTITY areaStyle 'fill:none;stroke:green;stroke-width:0.002;'>
  <!ENTITY dummy 'fill:none;stroke:#FFFFFF;stroke-width:0.001;strokemiterlimit:4;stroke-dasharray:0.3 0.5 0.3 0.5 0.3 0.5;'>]>
<svg id='NEW YORK' width='100%' height='100%' viewBox='-7403542 4487040 24295 26728'>
<!-- MinXY(-7403542,-4487040) MaxXY(-7379247,-4460312)-->
<g id='AREA_NEW YORK' style='&areaStyle;' >
 <g id='AreaOrder8'>
    <path id='11107Area' fill='rgb(200,200,200)' stroke='none' d='M
      -7393391,-4487040 -7392528,-4486638
      -7392502,-4486626

<path id='137622Line' stroke='rgb(90,90,90)' stroke-width='4' d='M
  -7397598,-4474402 -7397314,-4474244
  '/>
<path id='137660Line' stroke='rgb(90,90,90)' stroke-width='4' d='M
  -7396041,-4473763 -7395881,-4473674
  '/>

</g>
  <g id='TEXT_PointCenterPoint' >
  </g>
 </g>
</svg>
```

Fig. 13

```
<State> California
    <City> Irvine
    </City>
    <City> Foothill Ranch
    </City>
    <City> Laguna Niguel
    </City>
    <City> Tustin
    </City>
    ..........................
    ..........................
    ..........................
    ..........................
    ..........................
    <City> Westminster
    </City>
    <City> Newport Beach
    </City>
</State>
```

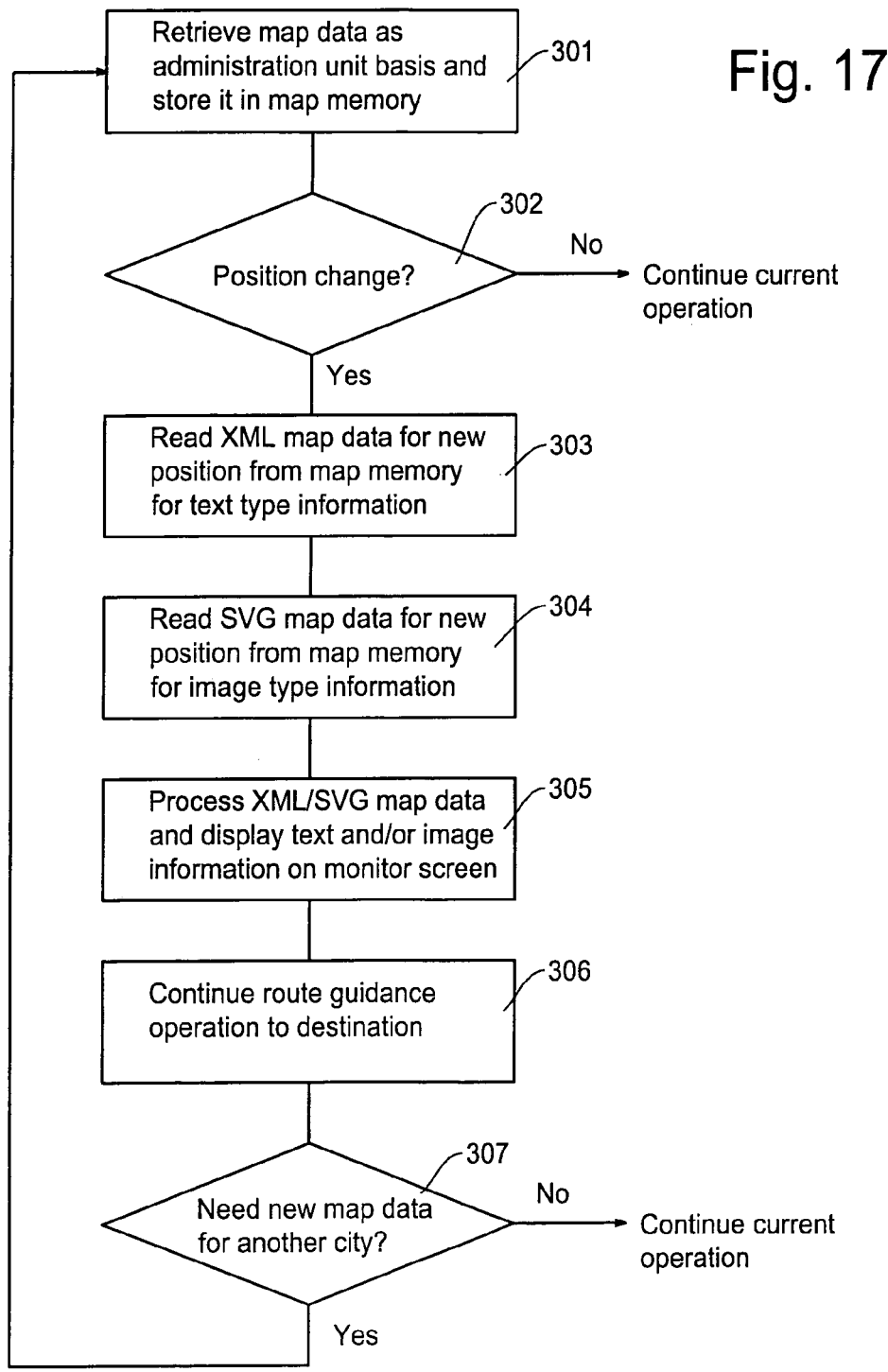

NAVIGATION SYSTEM UTILIZING XML/SVG MAP DATA CONVERTED FROM GEOGRAPHIC MAP DATA AND LAYERED STRUCTURE OF XML/SVG MAP DATA BASED ON ADMINISTRATIVE REGIONS

FIELD OF THE INVENTION

This invention relates to a navigation system utilizing XML/SVG format map data converted from generally available geographic data and to a layered structure of the XML/SVG format map data created on the basis of administrative regions such as cities, counties, and states.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user. At an intersection, the navigation system notifies the user which direction to turn at the intersection.

In creating the map data for a navigation system, geographic data available in the market is used as the original data to be converted to a map data format that is suitable for a navigation system. For example, such geographic data is in a GDF (geographic data file) format which is a standardized format for geographic (map) data that is typically provided by a map data provider. The GDF format defines the data structure (physical record structure) which includes "Field Name", "Size", "Type", "Description", etc. in a predetermined order.

Since the GDF is created as a map data file to simply describe the topological structures, it is not always well suited for a navigation system unique to a particular manufacturer of the navigation systems. Thus, a manufacturer usually converts the GDF format data into a data format that is more suitable for the hardware and software of a proprietary navigation system. Further, to improve the functionality of the navigation system, it is frequently necessary for the manufacture of the navigation system to modify, remove and add a relatively large amount of data to the original map data file.

Since the GDF format file has disadvantages that it is difficult to modify its data contents, in the conventional technology, the GDF format is converted to a file format, for example, PSF (physical storage format), to actually use the map data in a navigation system. The PSF is a format that takes the limitation imposed by the hardware performance of the navigation system into consideration while making the map data suitable for performances of the navigation system.

FIG. 1 is a schematic diagram showing an example as to how the original GDF map data is constructed into meshed data in the PSF file. In this method, a map area 63 is a graphical representation of a selected area such as a county, a city, etc., that is generated by the original map data provided by a map data provider. In the PSF file, the map area 63 is divided into a plurality of meshed portions (cells) 61 each having a rectangular shape of a predetermined size. Each meshed portion 61 includes bit-mapped graphical data (raster graphics) for displaying a map image on a display screen of the navigation system.

During the process of converting the GDF map data to the PSF map data, in order to accommodate several different map scales for enlarging or shrinking the map image on the display screen, a plurality of bitmap data with different sizes need to be produced based on the GDF map data. This requires additional processes of data conversion and calculation, which increases the conversion time and labor. Further, because the map area is divided into a plurality of meshed portions 61, the chances of causing inconsistencies between adjacent meshed portions 61 would increase, which is undesirable since the accuracy of the map would be deteriorated. Moreover, because the format of the PSF map data is fundamentally different from that of the GDF map data, the process to convert the GDF map data into the PSF map data is extremely complex and time consuming. For example, in the case where the map data covers a large area such as the whole north America, the process for conversion can take several weeks.

Other disadvantage associated with the PSF map data in the conventional technology is its inflexibility and lack of expandability. As noted above, it is often necessary to update the map data for a navigation system because of new roads and new buildings. The process of adding the new data or modifying the existing data in the PSF data file generally requires regeneration of all the map data. It may also be necessary to change the compilation (conversion) program. This is partly due to the fundamental difference between the PSF data format and GDF data format, since the PSF data utilizes raster graphic data even though the GDF format data utilizes a text based format. In addition, because the PSF data is machine dependent, recompilation of the data would be necessary if different hardware or software is to be used or an existing navigation system is changed or modified.

As described above, the conventional technology utilizing the conversion between the GDF format and the PSF format involves various disadvantages. Since it is always necessary that the old map data be updated or supplemented by new map data for a navigation system, there is a need of a new flexible format for map data that can be easily understandable and editable. Further, there is a need of a new map data format for a navigation system that can be quickly converted from the GDF format data.

SUMMARY OF THE INVENTION

It is, therefore, an object of the present invention to provide a navigation system utilizing XML/SVG format map data converted from geographic data.

It is another object of the present invention to provide a method of producing the map data for use with a navigation system by converting the geographic data such as GDF format map data to XML/SVG format map data.

It is a further object of the present invention to provide a method of utilizing the map data in the XML/SVG by a navigation system so that the map data can be easily modified and updated since the XML/SVG map data is human-readable and recognizable text data.

It is a further object of the present invention to provide a method of producing the map data for use with a navigation system by directly converting the GDF format map data to the XML/SVG format map data, thereby dramatically decreasing the time required for data conversion.

It is a further object of the present invention to provide a method of constructing the map data in the XML/SVG format data in a layered structure based on administrative regions such as states, counties and cities.

It is a further object of the present invention to provide a system for delivering the map data in the XML/SVG format data in an administrative region basis to a user through a communication network such as Internet.

According to the present invention, the navigation system for guiding a user to a destination is comprised of a map data storage for storing XML (extensible markup language) and/or SVG (scalable vector graphics) format map data converted from geographic data such as GDF (geographic data file) format map data available in the market, a controller for controlling an overall operation of the navigation system with use of the XML/SVG format map data, and a display controlled by the controller for interfacing with the user and guiding the user to the destination. The XML/SVG format map data is constructed in a layered structure based on administrative regions.

Another aspect of the present invention is a method of converting map data. The conversion method comprises the following steps of retrieving a predetermined amount of geographic data such as GDF (geographic data file) format map data available in the market, analyzing the retrieved GDF format map data, and converting the analyzed GDF format map data to XML (extensible markup language) and/or SVG (scalable vector graphics) format map data.

According to the present invention, the navigation system utilizes the XML/SVG format map data converted from the GDF format map data. Thus, the map data can be easily modified and updated since the XML/SVG map data is human-readable and recognizable text data. Further, in the present invention, by directly converting the GDF format map data to the XML/SVG format map data, the time required for data conversion can be dramatically decreased. The map data in the XML/SVG format is constructed in a layered structure which is created based on administrative regions such as states, counties and cities. Further, the map data in the XML/SVG format is suitable for transmission through the communication system such as Internet, thus, the user is able to retrieve the desired map data from the remote data server through the communication system.

BRIEF DESCRIPTION OF THE DRAWINGS

FIG. 3A shows a basic concept of converting the map data from the GDF format to the XML/SVG format, and FIG. 3B shows a hardware structure for converting the map data from the GDF format to the XML/SVG format.

FIG. 6 is a table showing a relationship between GDF attribute codes and counterpart XML-SVG elements for converting the GDF format map data to the XML/SVG format map data in the present invention.

FIG. 9A is a block diagram showing a relationship between the logical structures of the GDF map data and the SVG map data, and FIG. 9B is a table showing an example of assigning the data type to XML and/or SVG when converting the geographic data file to the XML/SVG file in the present invention.

FIGS. 10A and 10B show an example of description in the XML text data that correspond to the GDF map data shown in FIG. 7.

FIG. 11 shows an example of description in the SVG text data for graphical representation of the map data that corresponds to the GDF map data of FIG. 7.

FIG. 13 shows an example of description in the XML text data that describes the map data on the basis of administrative area in the present invention.

FIG. 17 is a flow chart showing an example of operational process for utilizing the XML/SVG format map data in the navigation system in accordance with the present invention.

DETAILED DESCRIPTION OF THE PREFERRED EMBODIMENT

Figure 1:
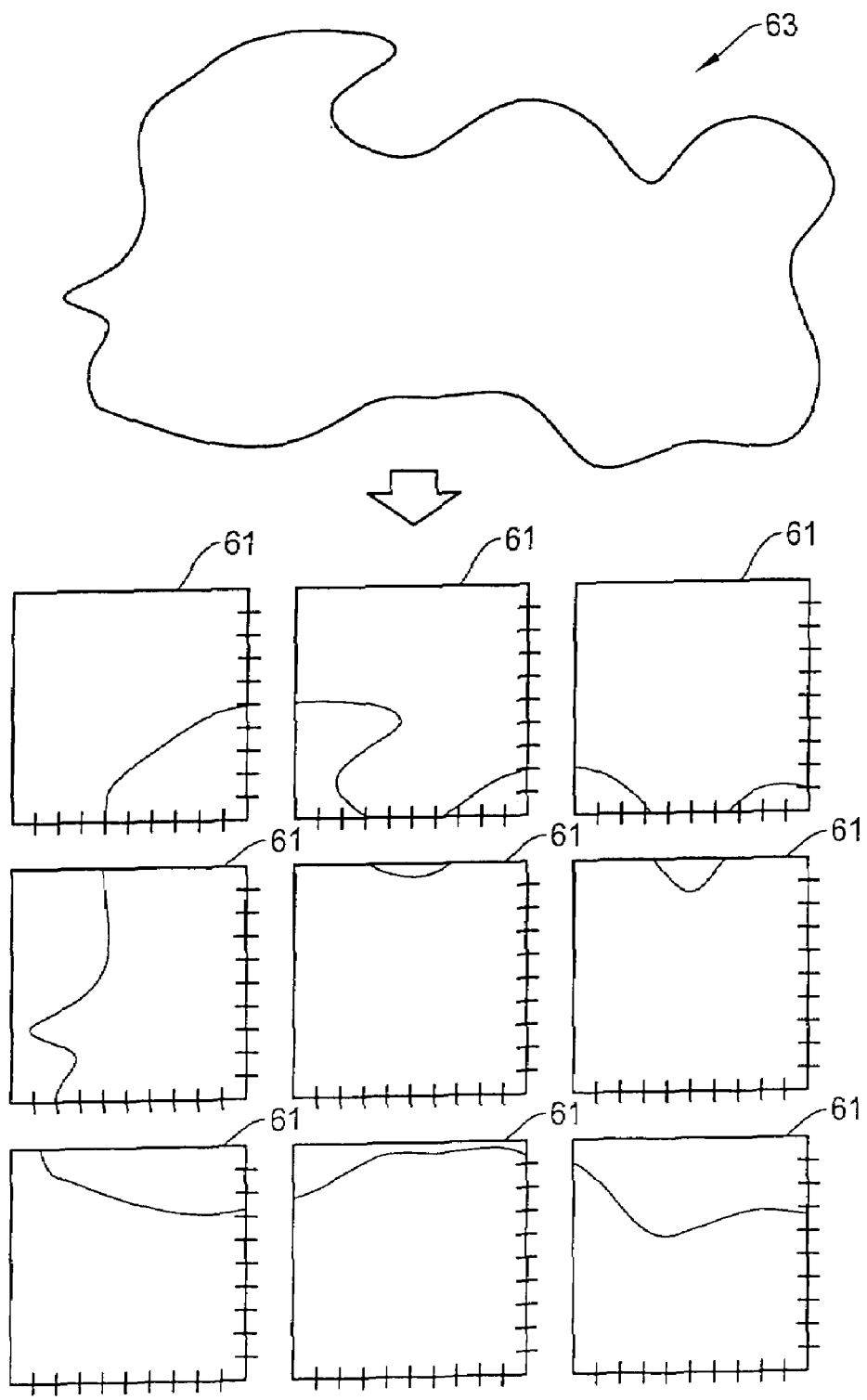
FIG. 1 is a schematic diagram showing a conventional method of utilizing the map data for a navigation system by dividing a selected area into a plurality of rectangular areas or cells.

The navigation system of the present invention will be described in more detail with reference to the accompanying drawings. The navigation system of the present invention utilizes map data in an extensible markup language (XML) and scalable vector graphics (SVG) format converted from geographic data such as GDF (geographic data file). The map data in the XML/SVG format for the navigation system is further constructed in a layered structure, i.e., having a plurality of different levels, based on administrative jurisdictions such as cities, counties, and states.

It should be noted that although the present invention will be described for the case of converting the GDF map data to the XML/SVG map data for an illustration purpose, geographic data other than GDF can also be used in the present invention. It should also be noted that the specific names, XML and SVG, are used in the present invention for describing the languages or formats of the map data only for an illustration purpose. Thus, the scope of the present invention should not be limited to such particular names but should encompass any language and format equivalent to that of XML and SVG in function and effect.

Ordinarily, as noted above, a manufacturer of a navigation system purchases GDF map data from a map data provider and converts the GDF to a proprietary format such as PSF (physical storage format) that is unique to a particular navigation system. Such a conversion process takes a very long time, for example, several weeks because the format between the GDF data and the PSF data is completely different. Further, in the conventional technology, it is necessary to divide the map data of a selected area into a plurality of area cells (meshed portions), which is also time consuming. Further, once the map database is constructed, it is not possible to easily modify or update the contents of the map data.

In the present invention, however, the navigation system utilizes the XML/SVG format map data which is directly converted from the GDF format map data. XML is an extensible markup language that has been standardized and is gaining acceptance for many types of applications. Further, XML is a markup language that is easy to read as it uses human-readable tags to describe the data. The extensible language allows programmers to define new description forms by specifying what the new syntax looks like. This allows a structured data format which is easily recognizable and modifiable.

SVG is a type of mark-up language for describing graphic images using XML syntax. In other words, SVG is a mark-up language designed after XML syntax used to create vector graphics for display on computer systems. SVG can include geometric forms such as lines, points, polygons, curves, circles, as well as text and embedded images. It allows to embed arbitrary contents more freely compared to the conventional data format. In the present invention, the SVG format data is primarily used for displaying map images and the XML format data is used for the remaining map data to provide improved functionality for the navigation system. The detailed example for mapping the specific type of map data to either XML or SVG, or both XML and SVG is shown in FIG. 9B.

The GDF format map data is mainly comprised of catalogues such as the feature catalogues, attribute catalogues, relationship catalogues, etc. The feature catalogue provides a definition of the "real world objects" such as roads, buildings, administrative areas and settlements that have significance in the broad area of applications for this standard. They all relate to the road environment. The attribute catalogue defines a number of characteristics of features and possibility of relationships. Some attributes are dedicated to one particular map element, and other attributes may be more generally applied. The relationship catalogue describes relations between two or more features that may be used to convey information. For example, a relationship may exist between road elements and POIs such that a POI "is along" a road element.

Figure 2:
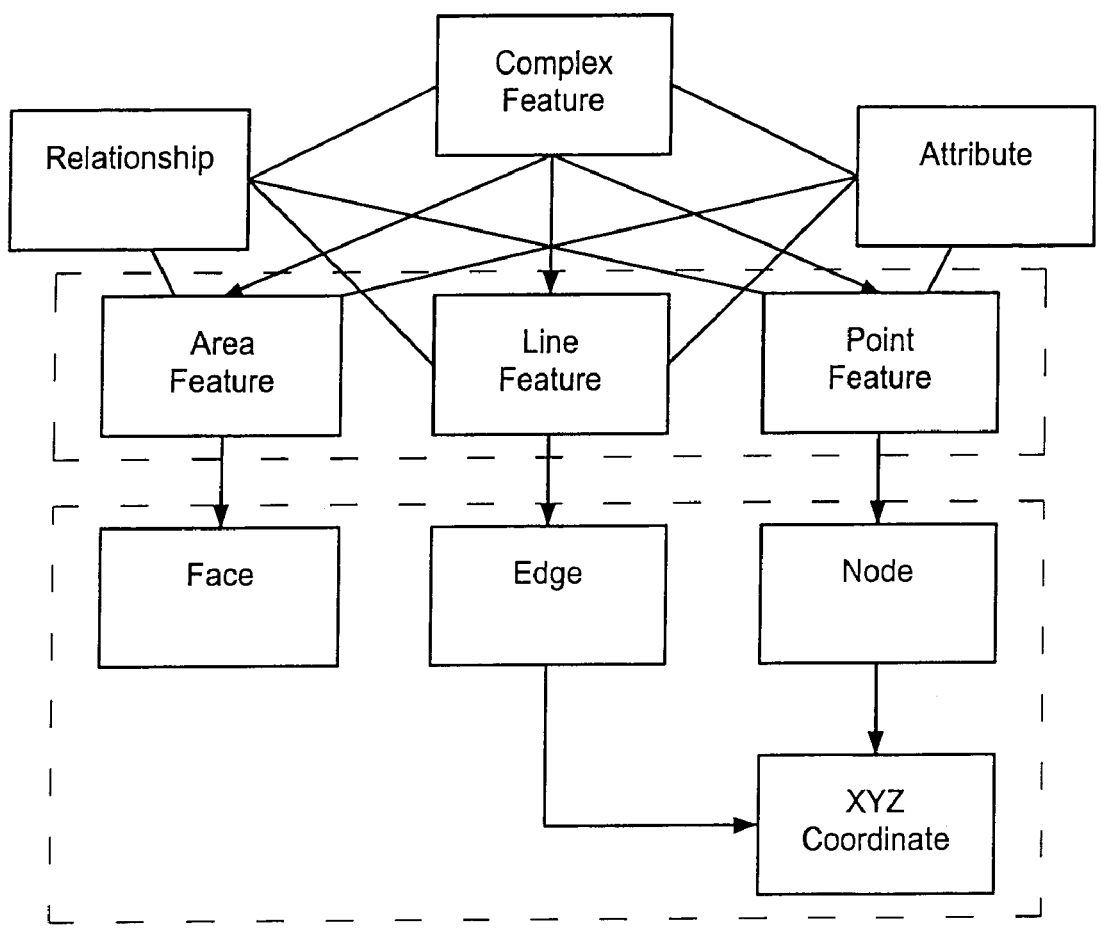
FIG. 2 is a block diagram showing an example of logical structure of the GDF format map data which is original map data to be converted to a data format appropriate for a navigation system.

A simplified representation of the GDF data logical structure is shown in the schematic block diagram of FIG. 2. Many elements of the GDF data are interrelated as shown in the block diagram. For instance, "Complex Feature" is related to "Relationship", "Attribute", "Area Feature", "Line Feature", and "Point Feature". Due to the complexity, understanding the contents of the GDF data is difficult, requiring special knowledge and experience. Moreover, since the way and order of describing the information are fixed, alteration, deletion, and addition of the information is difficult and time consuming.

Figure 3A:
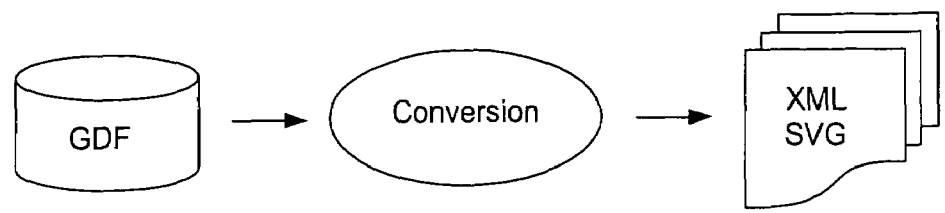
FIGS. 3A-3B are schematic diagrams showing a basic concept of the present invention, where

In the present invention, the map data in the SVG/XML format is created by directly converting the GDF format map data to the SVG/XML format map data as shown in FIG. 3A. The conversion program retrieves the map data from the GDF data storage, analyzes the retrieved data, and produces the SVG/XML format map data. The SVG/XML format map data is stored in the map data storage (DVD) 31 of a navigation system shown in FIGS. 15 and 16.

Figure 3B:
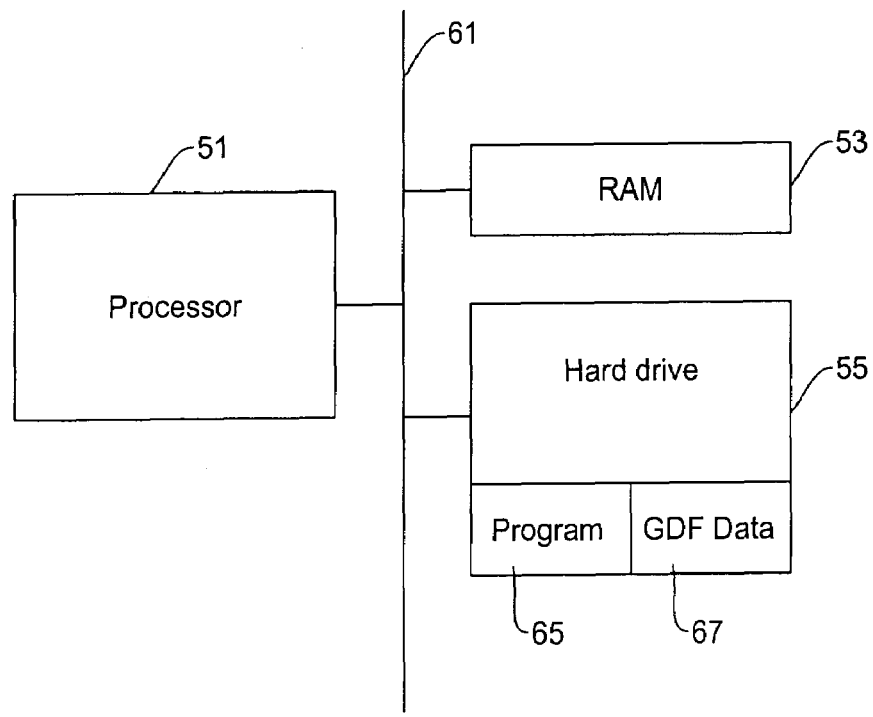

FIG. 3B is a block diagram showing hardware components for converting the GDF format map data to the SVG/XML format map data under the present invention. The conversion system comprises a processor 51, a bus 61, a random access memory (RAM) 53, and a data storage such as a hard disk 55. The processor 51, RAM 53, and the hard disk 55 are connected through the bus 61. The hard disk 55 stores a conversion program 65 and the GDF map data 67. The processor 51 executes the conversion program 65 to convert the GDF map data 67 to the SVG/XML map data.

Figure 4:
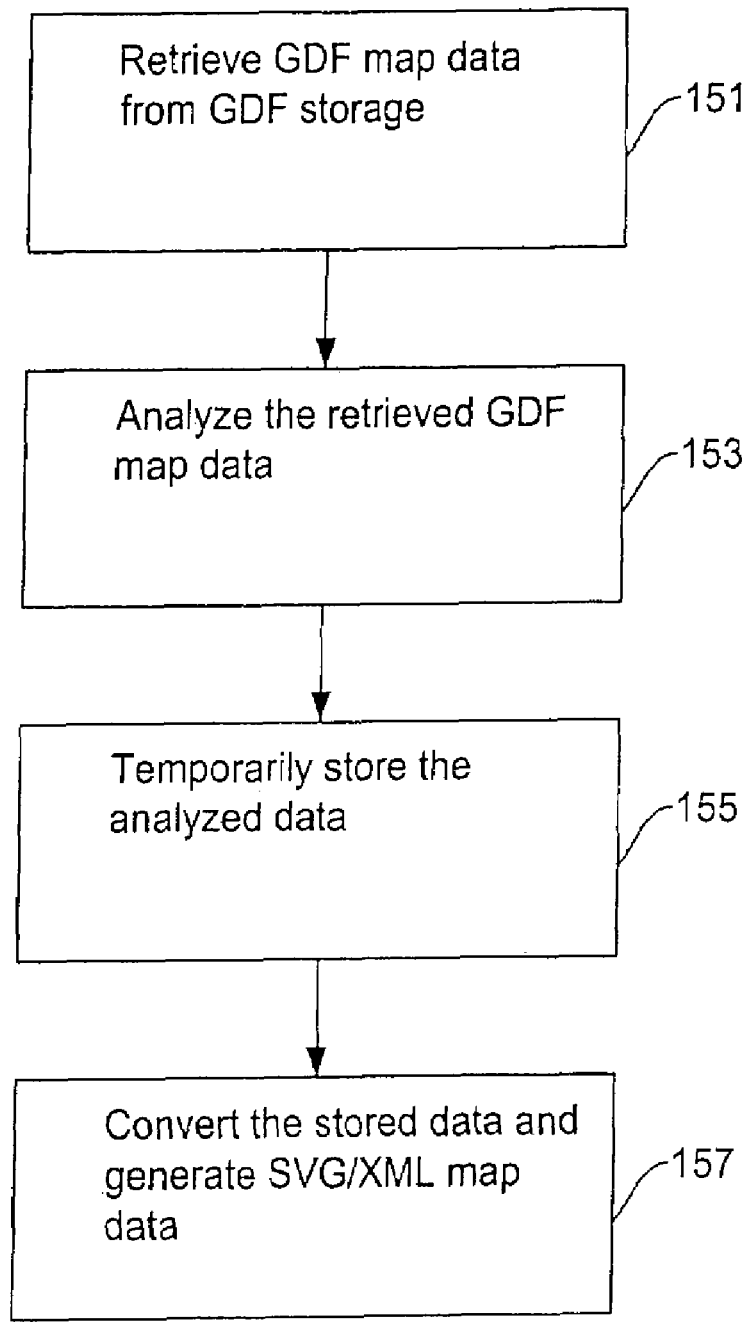
FIG. 4 is a flow chart showing an example of basic process of the present invention for creating the map data for a navigation system by converting the GDF format map data to XML/SVG format map data.

FIG. 4 is a flow chart showing basic steps for converting the GDF format map data into the SVG/XML map data in accordance with the present invention. In the first step (step 151), the process retrieves the predetermined amount of information in the GDF format map data to be converted. In step 153, the GDF format map data retrieved in the step 151 is analyzed. In step 155, the process stores the data that have been previously analyzed into a storage device such as the RAM 53. Finally, the process generates the XML/SVG format map data from the stored data (step 157).

Figure 5:
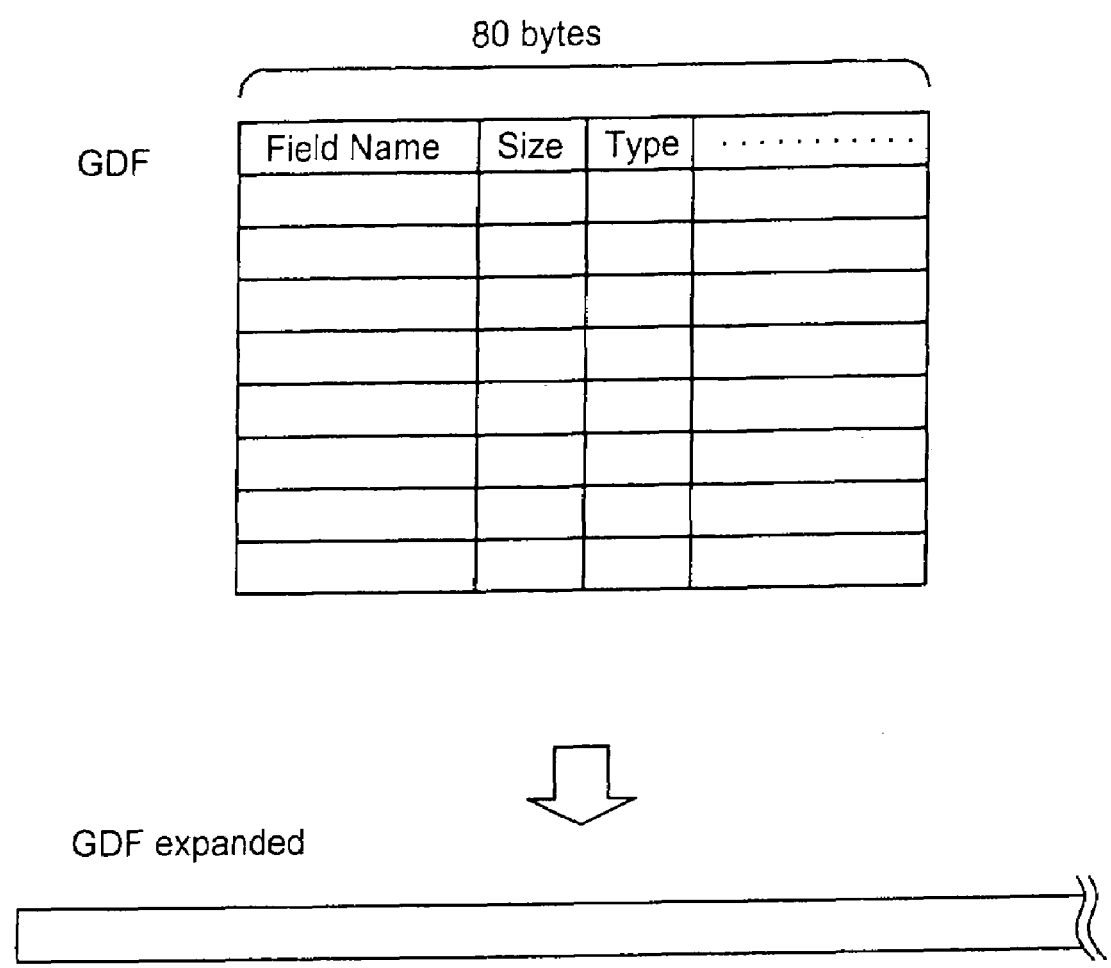
FIG. 5 is a schematic diagram showing a process for reading the GDF format map data covering a predetermined region and analyzing the map data for converting to the XML/SVG format map data in the process of FIG. 4.

The steps described above are explained in more detail. In the step 151 of FIG. 4, the processor 51 of FIG. 3C retrieves the information from the GDF format data that is stored in the data storage such as the hard disk 55 of FIG. 3C. Typically, the original data in the GDF format is physically comprised of a multiple rows of 80 byte text data as a building block. Because the information in the GDF format map data is not clustered in a small scale, a large amount of data, such as one whole county, has to be retrieved. Conceptually, the retrieved GDF format map data is collapsed (expanded) into a long strip of text data for analysis as shown in FIG. 5.

In the next step 153, the conversion program (processor 51) will analyze the data that is retrieved in the previous step 151. As noted above, the data in the GDF format has many data elements that are interconnected. Thus, their relationships need to be analyzed to obtain complete relationships among data elements. In this step, the processor 51 analyzes and determines record types and semantics. In some instances, the GDF format map data provides an instruction that the same data must be read out repeatedly for a certain number of times. In such a case, the data must be read out repeatedly to obtain a complete data relationship.

The conversion from the GDF to XML/SVG can be conducted efficiently because a relatively large portion of the text data in the GDF map data can be used without change for the XML/SVG map data. For example, the latitude/longitude data concerning the position of the map element, such as roads, POIs, polygons, etc., can be used, as is, by simply adding the tags. Similarly, the data defining an administrative area, such as counties, cities, etc. in the GDF map data can be used without change by adding the tags.

The conversion program determines whether the data element is to be represented in the form of SVG or XML or both. In this example, basically, the SVG data format is used for displaying map image, and the XML data format is used for the remaining data elements. Thus, the conversion program finds that information relevant to displaying the map image and converts the information into the SVG format and converts the rest to the XML format. FIG. 9B shows a more detailed example for assigning either XML or SVG, or both XML and SVG for particular type of data.

Then, the converted data is stored in the memory in the step 155 and the XML/SVG format map data is produced in the step 157. In the example described above, both the XML and SVG format map data are generated simultaneously. However, it is also possible to generate the XML map data and the SVG map data separately and combine them in a later process. As noted above, the advantage of using the XML/SVG format map data is that it uses human-readable tags. When converting the GDF format to the XML/SVG format, the processor 51 of FIG. 3B arranges the stored data into a tagged format using a conversion table.

FIG. 6 is an example of a conversion table used in the conversion process of the present invention. The conversion table shows descriptions of the data elements, corresponding to GDF attribute codes, and XML/SVG element that is generated for a preferred embodiment under the present invention. Since the XML/SVG standard does not allow to use certain characters, the conversion table of FIG. 6 is needed to change some of the GDF attribute codes to be allowable for the tags in the XML/SVG format.

In FIG. 6, the description column 201 describes the elements of data associated in the map data. The column 203 for GDF attribute code indicates the codes used in the GDF format data for corresponding data elements. The column for XML/SVG element 205 lists names (tags) of XML/SVG elements that correspond to the GDF attribute codes.

For instance, for "Speed Category", the name of the XML/SVG element is expressed as "SC" by taking initials of the description because the "@I" used in the GDF attribute code is not allowed in the XML/SVG standard. Likewise, the XML/SVG element for "Type of Street Name" is named "STT" because the "!T" used in the GDF attribute code is not allowed in the XML/SVG standard. The XML/SVG element for "Full Geometry" is named "FG" because the numeric characters "27" used in the GDF attribute code is not allowed in the XML/SVG standard.

It is also possible to name the elements to be more descriptive of the data. For example, instead of "SC" for speed category, more descriptive names such as "SPEED_CATEGORY" may be used as well. Any descriptive name may be used for the XML/SVG elements since the XML/SVG is freely extensible.

Figure 7:
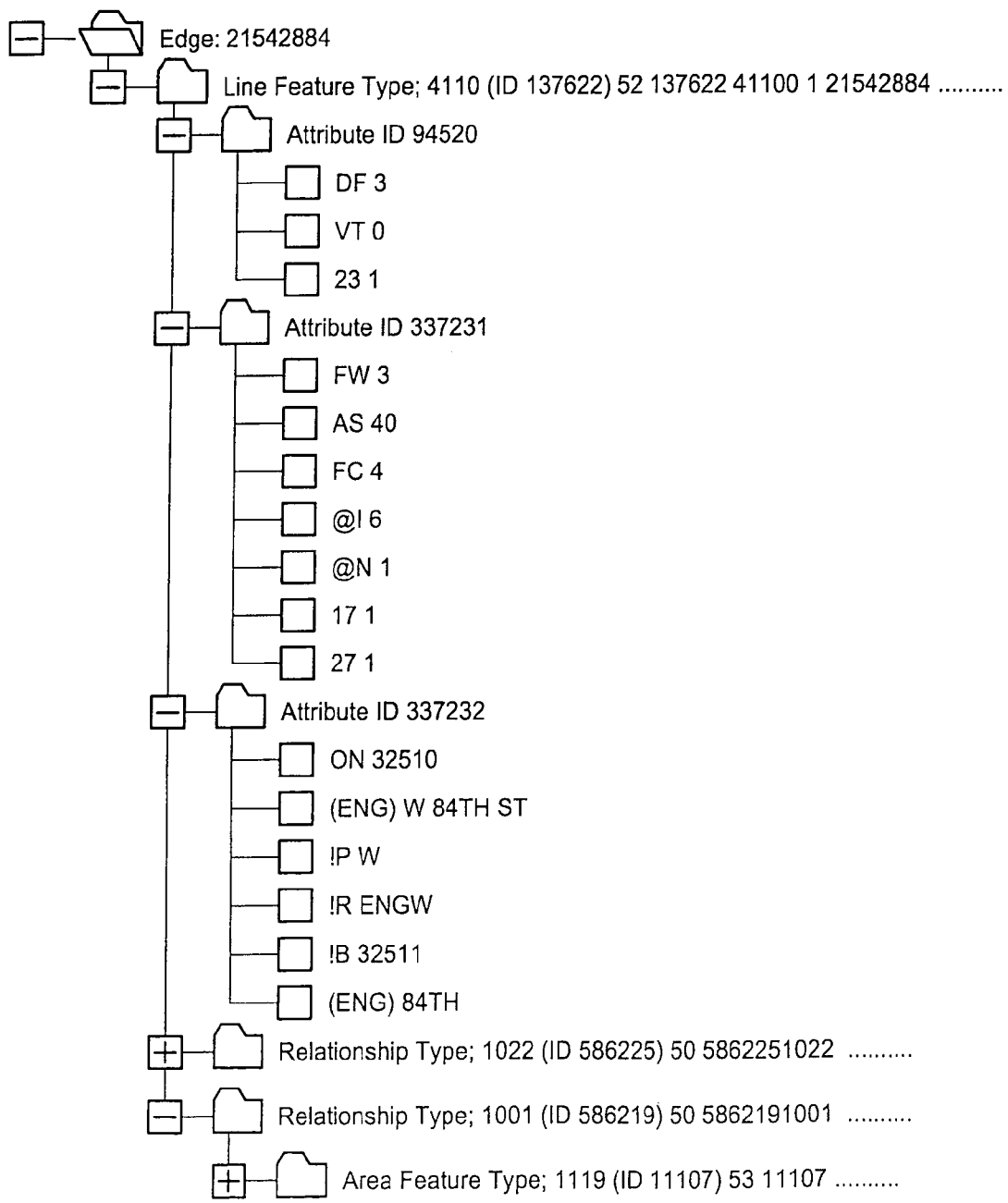
FIG. 7 is a graphical representation of an example of record in the GDF format map data on a computer screen through a GDF editor.

FIG. 7 is a graphical representation of an example of record in the GDF format map data on a computer screen through a GDF editor. Even through the GDF editor, it is not possible for the programmer to easily comprehend the contents of the map data in relation to an actual topological structure. This is mainly because that the GDF format data is a sequence of data with fixed format and thus does not provide user a relationship among the data in a visible manner.

Figure 8:
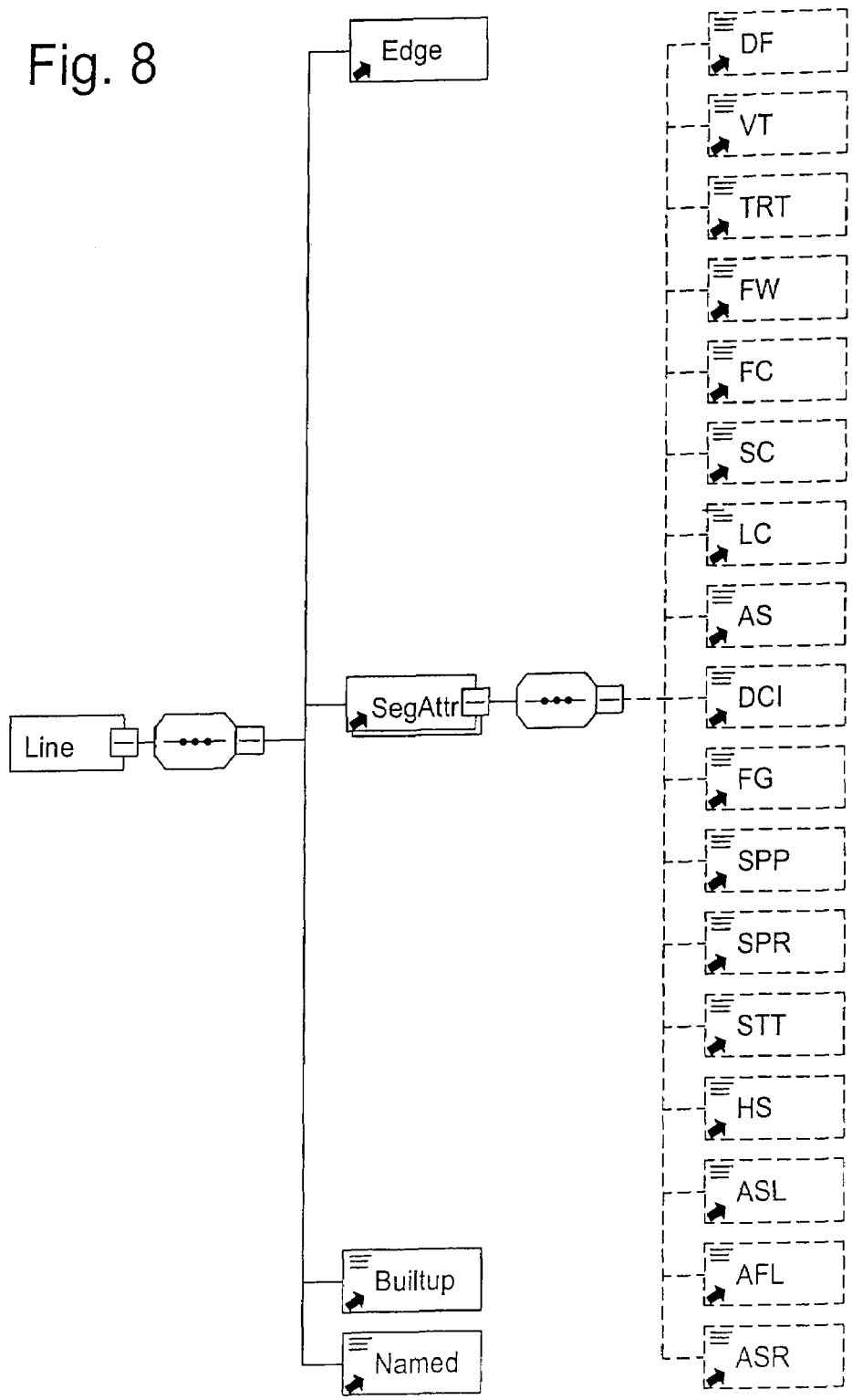
FIG. 8 is a graphical representation of the map data corresponding to that of FIG. 7 displayed on a computer screen through an XML schema editor.

FIG. 8 is a graphical representation of the map data corresponding to that of FIG. 7 displayed on a computer screen through an XML schema editor. Unlike the graphical representation of the GDF format map data of FIG. 7, the XML format map data in FIG. 8 is easily comprehendible because a topological structure such as a road link can be expressed by one set of data in a layered structure. Such one set of data can be stored in the file and retrieved from the file. Further, even without using the XML schema, the XML/SVG format text data is human-readable as shown in FIGS. 10A and 10B.

FIG. 9A is a schematic diagram showing the relationship between the logical structures of the XML/SVG map data and the GDF map data. The schematic representation of the SVG format data corresponding to the GDF data is shown in the lower part of FIG. 9A. The complexity of the GDF data is reduced because of the nested structure of the SVG which shows links among the data for each map element.

FIG. 9B is a table showing an example of assigning the data type to XML and/or SVG when converting the geographic data file to the XML/SVG file in the present invention. For example, a map element such as a road link involves various types of data as shown in the data column of the table. Such types of data include ID number, shape type, name, address, road class, etc. The table of FIG. 9B shows that the data showing the shape type (image type information) is expressed by SVG while the data showing the name, address, traffic regulation, etc. (text type information), is expressed by XML. The data showing the ID number and road class is also expressed both by SVG and XML. Similarly, the shape type of the polygon is expressed by SVG, the ID number of the polygon is expressed both by SVG and XML, and others are expressed by XML. With respect to POI (point of interest), the ID number, location, category of the POI are expressed both by SVG and XML while other elements of the POI are expressed by XML.

FIGS. 10A and 10B show an example of description in the XML text data that corresponds to the GDF map data shown in FIG. 7. FIG. 11 shows an example of description in the SVG text data for graphical representation of the map corresponding to the GDF map data of FIG. 7. As seen from FIGS. 10A-10B and 11, the XML/SVG test data is easily modifiable because it incorporates human-readable tags.

Figure 12:
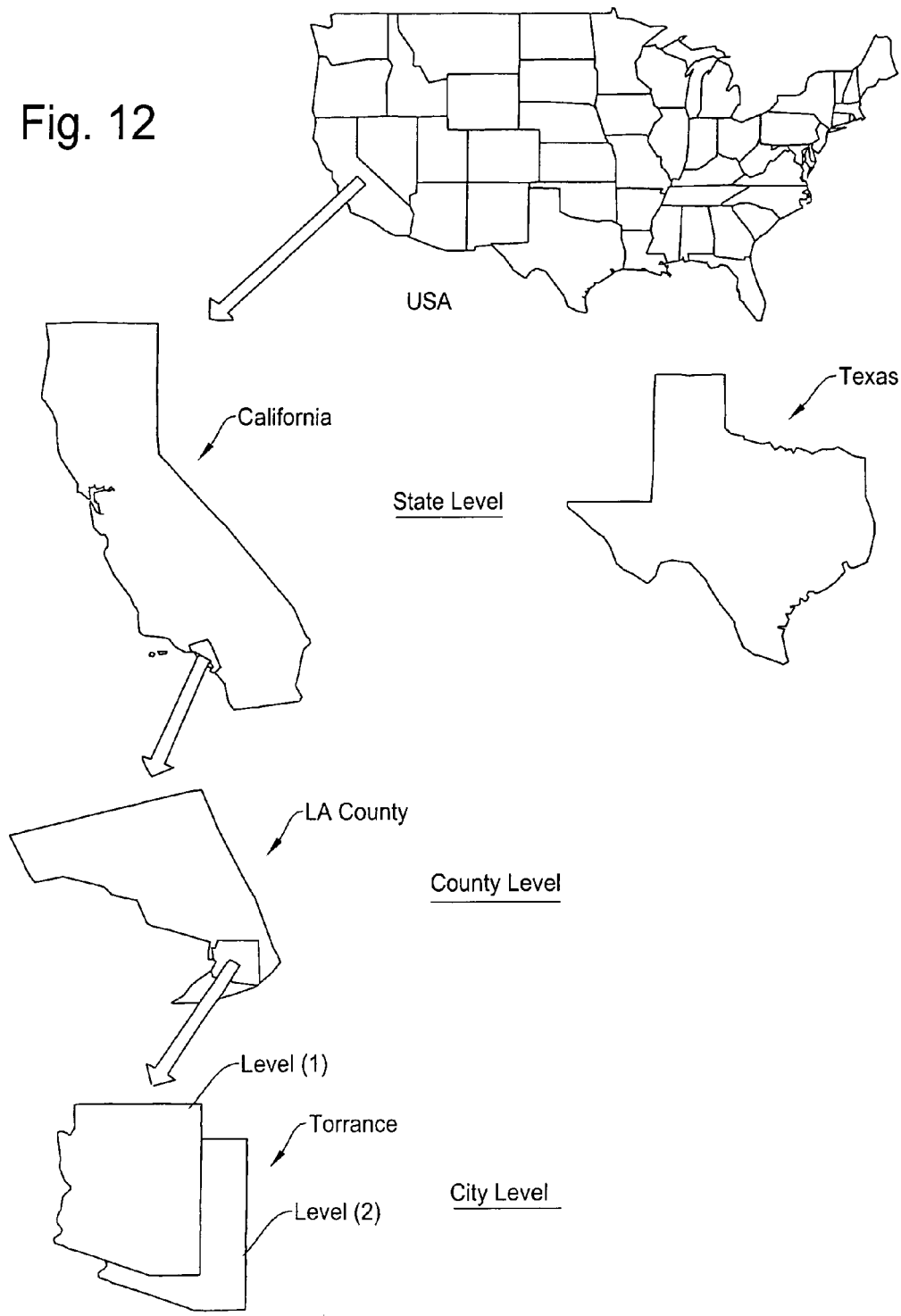
FIG. 12 is a schematic diagram showing an example of layered structure of the XML/SVG map data configured on the basis of administrative areas in the present invention.

FIG. 12 is a schematic diagram showing a basic concept of the present invention where the navigation system utilizes a layered structure of the XML/SVG format map data configured on the basis of administrative areas. In the conventional technology, as shown in FIG. 1, the map data of the selected area is divided into a plurality of cells (meshed portions). In the present invention, however, the XML/SVG format map data is constructed in a layered structure which is based on administrative jurisdictions such as states, counties, and cities. In the example of FIG. 12, the highest layer of the XML/SVG format map data is assigned to an overall USA (country level), the second highest layer is assigned to states (state level), and the next layer is for counties (county level), and the lowest layer is for cities (city level).

In this example, the lowest layer (city level) is further divided into a first layer and a second layer since the lowest level of map data such as a city usually needs a large amount of data. For example, the first layer includes the map data for major roads in the city while the second layer includes the map data for smaller roads in the city. Although not shown, another layer which includes the information on points of interest (POI) will also be incorporated in the city level layer.

For processing the meshed map data, as in the conventional technology, relatively complicated calculation is necessary. In the present invention, however, the XML/SVG format map data in different layers can be overlapped, which requires simple processing. Since the original GDF format map data is constructed based on administrative jurisdictions, such layered XML/SVG format map data can be easily created. Due to the generation of XML/SVG map data in the process described above, searching and listing of map data based on the jurisdictional unit becomes easier compared to the conventional technology.

FIG. 13 shows an example of description in the XML text data that describes the map data on the basis of administrative area in the present invention. This example shows a case which lists cities in the state of California by the XML text data, where the city categories are included in the state category. Thus, for example, in the city of "Irvine", many categories are nested such that their relationships with one another are clarified. Data for such elements as the road, POI, etc., are further included in each city category although they are omitted in FIG. 13 to simplify the feature of the present invention.

By nesting the data into the jurisdiction (administration region) basis, several advantages can be obtained. The user can easily search particular point of interest (POI) within a city because the navigation system utilizing the layered XML/SVG map data described above. A user may be able to purchase or upgrade a desired city map. For example, the user may update the map data for only the city of Irvine rather than an area that include several other cities that the user does not desire to update. Moreover, when a city or a state changes its traffic regulation, updating the data to reflect this change is easily done due to the nested structure of the XML/SVG format map data.

Figure 14:
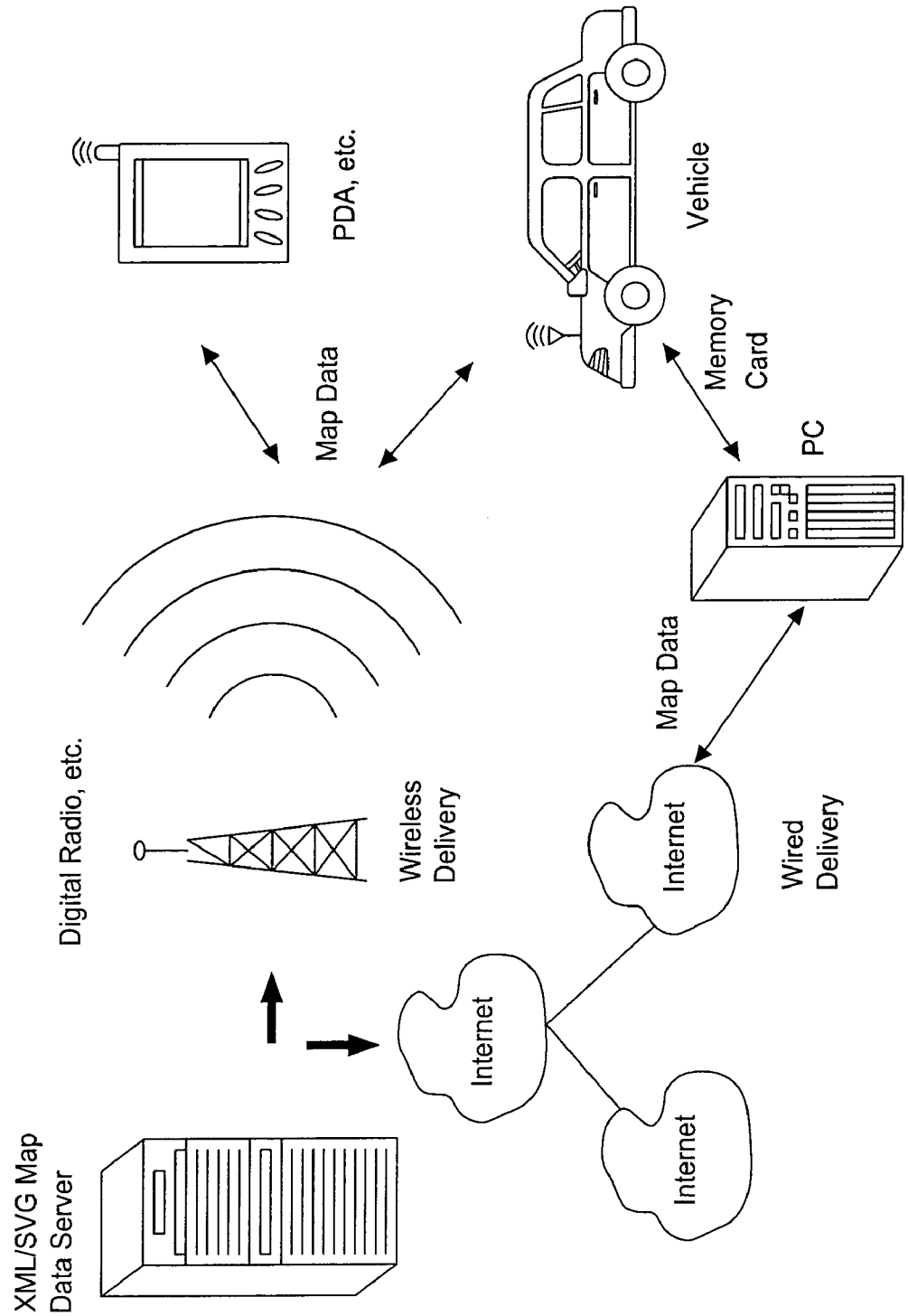
FIG. 14 is a schematic diagram showing an example of overall system for providing the XML/SVG map data configured on the basis of administrative regions to a user through the communication network in the present invention.

Since the map data is in the XML/SVG format, it is possible to transmit the map data through the modern communication system, typically, Internet or digital radio system. FIG. 14 is a schematic diagram showing an example of overall system of the present invention for providing the XML/SVG map data configured on the basis of administrative areas to a user through the communication network. This example basically shows that an XML/SVG map data server provides a user with the map data in the XML/SVG format through wireless communication or wired communication. An example of wireless communication includes digital radio, satellite radio, FM sideband, etc., and an example of wired communication includes Internet via telephone communication network.

The user having a hand-held navigation system, a vehicle navigation system, a PDA, a cellular phone, or a personal computer (PC) can request the map data as a unit of administrative region through the communication network by specifying, for example, an administrative region ID, etc. In response, the XML/SVG map data server can retrieve and send the requested map data as a unit of administrative region to the user through the communication network. The received map data can be directly installed in the navigation system, PDA, etc. or through a memory card if the map data is received by PC. Thus, the navigation system does not need to have a map storage of large capacity and can easily obtain the newest map data.

Figure 15:
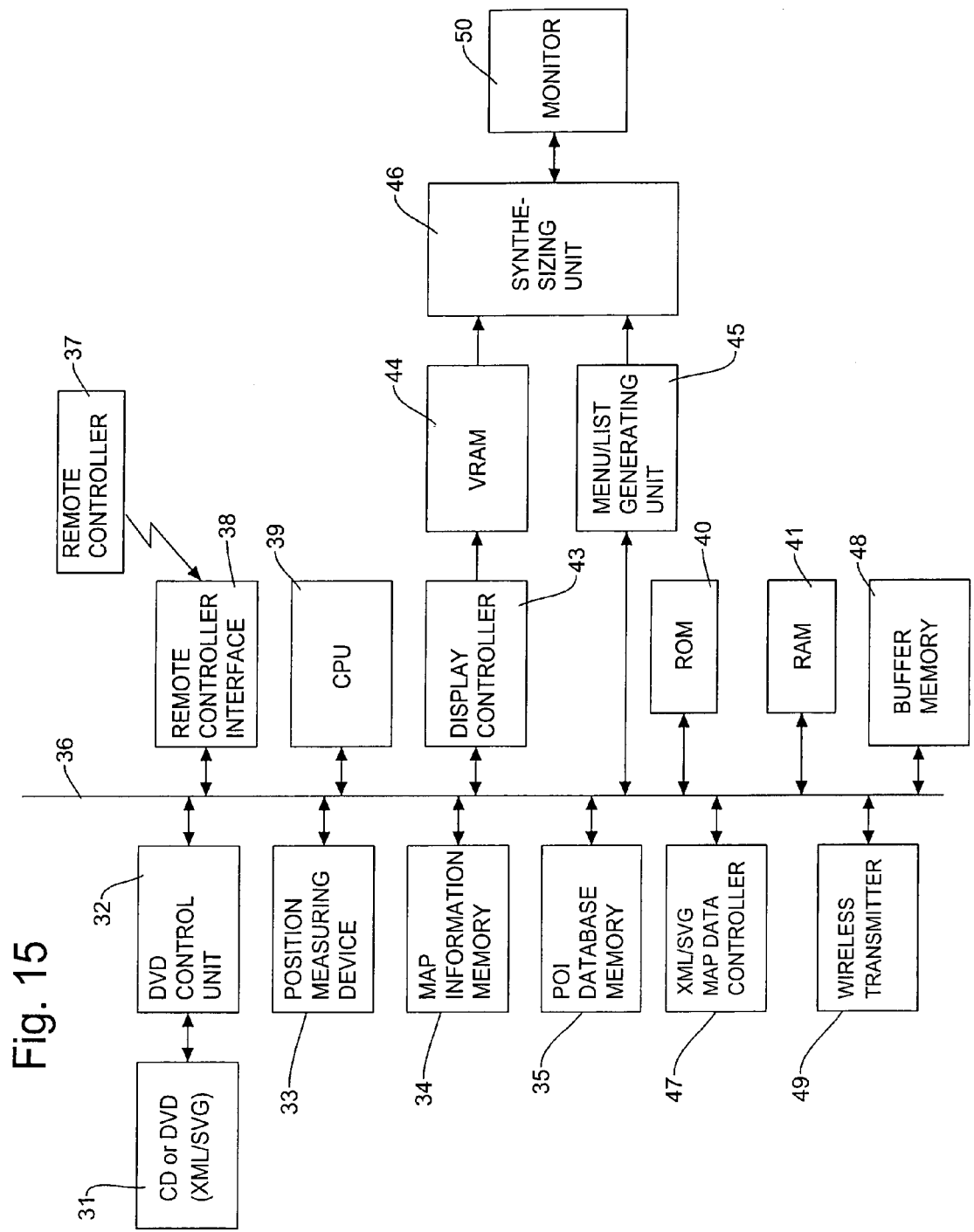
FIG. 15 is a block diagram showing an example of configuration of a vehicle navigation system implementing the present invention utilizing the XML/SVG format map data.

FIG. 15 shows a structure of a vehicle navigation system for implementing the present invention. While the vehicle navigation system is explained for an illustration purpose, the present invention can also be applied to other types of navigation system. For example, the present invention can be applied to a portable navigation device implemented by a PDA (personal digital assistant) device, other hand-held devices such as a wireless telephone, or a laptop or notebook computer.

In the block diagram, the navigation system includes a map storage medium 31 such as a CD-ROM, DVD, hard disc or other storage means (hereafter "DVD") for storing the map data in the XML/SVG format. As noted above, the XML/SVG format map data is created by converting the GDF format map data by the conversion method of the present invention. The navigation system includes a DVD control unit 32 for controlling an operation for reading the map information from the DVD, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver, and etc.

The block diagram of FIG. 15 further includes a map information memory 34 for storing the map information which is read from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 15, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, a wireless transmitter 49 for wireless communication to retrieve data from a remote server, a buffer memory 48 for temporally storing data for ease of data processing, and a monitor (display) 50.

An XML/SVG map data controller 47 controls the operation of the navigation system for utilizing the layered XML/SVG map data which is constructed on the basis of the administrative regions. In the conventional technology, as noted above, the map data of the selected area is divided into a plurality of cells (meshed portions). In the present invention, however, the XML/SVG format map data is constructed in a layered structure which is based on administrative regions such as states, counties, and cities. The XML/SVG map data controller 47 can be a separate processor or a part of CPU 39.

Figure 16:
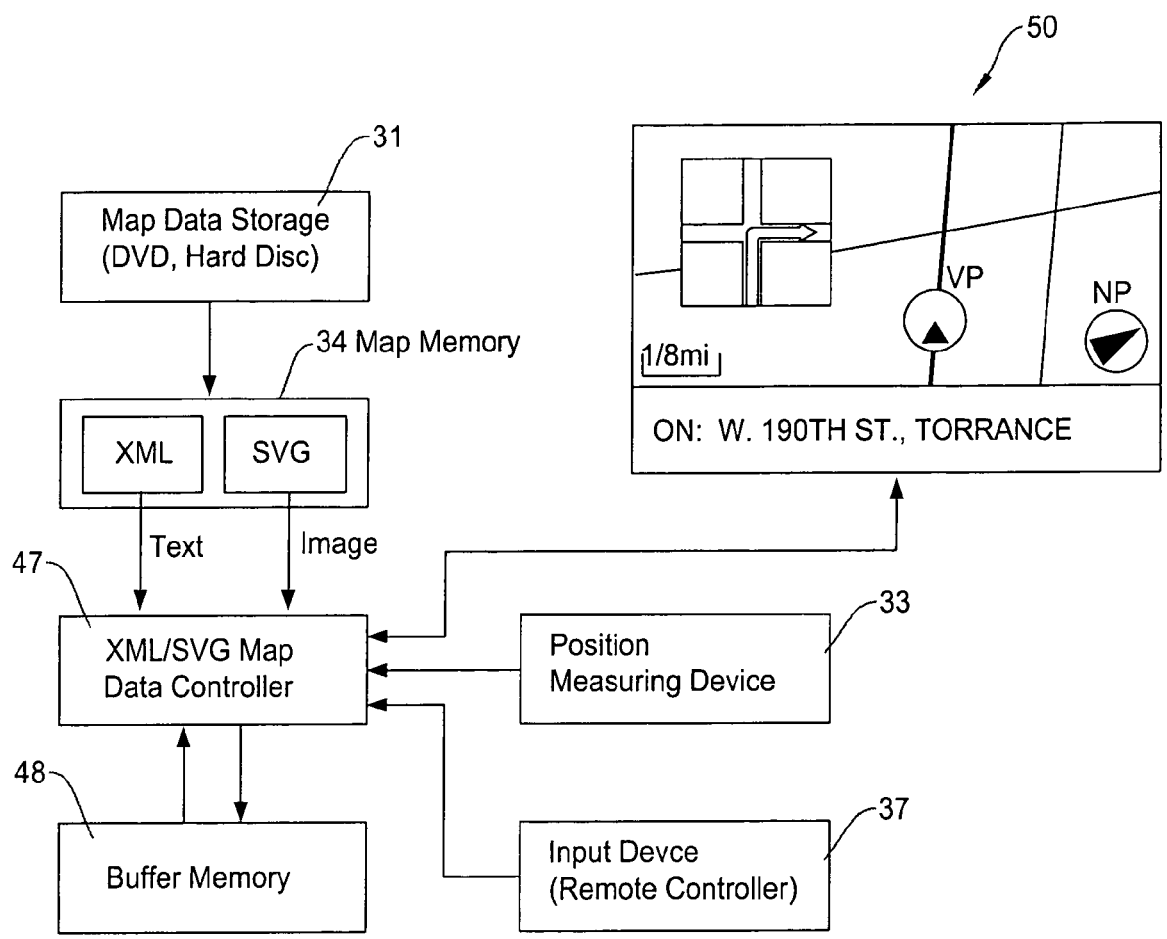
FIG. 16 is a functional block diagram showing a basic structure of an electronic device having a navigation function and implementing the present invention utilizing the XML/SVG format map data.

FIG. 16 is a functional block diagram showing an example of basic structure of an electronic device having a navigation function for utilizing the XML/SVG map data in accordance with the present invention. The structure of FIG. 16 is applicable to any electronic device having a navigation function which enables the electronic device to detect a current position of the user and guides the user to a destination as noted above. The components similar or identical to that in the block diagram of FIG. 15 are denoted by the same reference numbers.

The apparatus of the present invention includes a monitor 50 for interfacing with the user and displaying the information for the navigation operation in the text and image forms, an XML/SVG map data controller 47 for controlling an overall operation of the apparatus of the present invention. The block diagram of FIG. 16 further includes a map data storage 31 such as a DVD or a hard disc for storing the XML/SVG map data, a map memory 34 for storing the XML/SVG map data retrieved from the map data storage 31 as a unit of administrative jurisdiction, a position measuring device 33 which typically includes a GPS for detecting a current position of the user, an input device such as a keypad or a remote controller 37 for entering a destination, etc. by the user, and a buffer memory 48 for temporarily storing various types of data for processing and operation of the apparatus.

In FIG. 16, the apparatus of the present invention retrieves the XML/SVG map data from the map data storage 31 as a unit of administrative region, such as a city. Typically, the map storage 31 stores the XML/SVG format map data covering the whole country and the map memory 34 retrieves the map data covering a smaller area such as a city depending upon, for example, the current location of the user or the specified destination. If the electronic device implementing the present invention has a communication capability either through wire or wireless, such XML/SVG map data can be retrieved from a remote data server as a unit of administration region.

The XML/SVG map data controller 47 checks whether the map data required for the navigation operation and for the interface with the user is either the text information or image information. The XML/SVG map data controller 47 retrieves the map data from the XML database when the text information is required or from the SVG database when the image information is required. As soon as a destination is specified by the user through the input device 37, the XML/SVG map data controller 47 controls the map memory 34 to store the XML/SVG map data retrieved from the map data storage 31.

The XML/SVG map data controller 47 reads the XML/SVG map data from the map memory 34 and calculates a route to the destination. During the route guidance operation, the XML/SVG map data controller 47 controls the monitor screen 50 to display the calculated route, turn direction, etc., on the map image based on the current position detected by the position measuring (GPS) device 33. Such image type information will be displayed based on the SVG map data. The monitor 50 also displays a road name, an estimated arrival time, etc. Such text type information will be displayed based on the XML map data. During the process of calculating the route and displaying the image and text information, the buffer memory 48 may be preferably used to temporarily store the necessary data.

An example of basic operational process for using the XML/SVG map data in the navigation system of the present invention is shown in the flow chart of FIG. 17 which is explained below with also reference to the block diagram of FIG. 16. In step 301, suppose a user of the navigation system is currently in a certain area, the navigation system retrieves the XML/SVG map data of the administrative region covering the current area from the map data storage 31. As noted above, an example of such an administrative region is a city, county, etc. The XML/SVG map data retrieved from the map data storage 31 is stored in the map memory 34. Alternatively, as noted above with reference to FIG. 14, the XML/SVG map data of the administrative region basis can be obtained from the remote data server through the communication means and stored in the map memory 34.

In step 302, by checking the signal from the position measuring device 33, the navigation system determines whether there is any change in the position of the user. If there is a change in the position, and such a change has to be reflected on the monitor screen 50, in step 303, the navigation system retrieves the map data from the map memory 34 pertaining to the current position of the user. As noted above, if the map data is to process and display the text type information, the navigation system reads the XML map data from the map memory 34 in step 304. If the map data is to process and display the image type information, the navigation system reads the SVG map data from the map memory 34 in step 305. The navigation system processes the retrieved XML/SVG map data and displays the text and/or image information on the monitor screen 50.

In step 306, the navigation system repeats the above steps during the route guidance mode or other mode such as a locator map mode. During the operation of the route guidance mode or other mode, the navigation checks whether new map data for another administrative region such as a next city is necessary in step 307. Typically, when the user is travelling through one city to another city, the new map data for another city is necessary for the operation of the navigation system. Thus, if the new map data is necessary, the process goes back to the step 301 to repeat the above mentioned steps.

As has been described above, according to the present invention, the navigation system utilizes the XML/SVG format map data converted from the GDF format map data. Thus, the map data can be easily modified and updated since the XML/SVG map data is human-readable and recognizable text data. Further, in the present invention, by directly converting the GDF format map data to the XML/SVG format map data, the time required for data conversion can be dramatically decreased. The map data in the XML/SVG format is constructed in a layered structure which is created based on administrative regions such as states, counties and cities. Further, the map data in the XML/SVG format is suitable for transmission through the communication system such as Internet, thus, the user is able to retrieve the desired map data from the remote data server through the communication system.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation system for guiding a user to a destination, comprising:
   a map data storage for storing XML (extensible markup language) and/or SVG (scalable vector graphics) format map data converted from geographic data available in the market;
   a controller for controlling an overall operation of determining types of requested data for the navigation system either text data or image data and retrieves XML format map data when the requested data is text data and retrieves SVG format map data when the requested data is image data; and
   a display controlled by the controller for interfacing with the user and displaying the text data and/or image data;
   wherein the XML/SVG format map data is constructed in a layered structure based on administrative regions each being a unit of country, state, county, or city.

2. A navigation system as defined in claim 1, wherein, when converting the geographic data to the XML/SVG format map data, latitude/longitude information in the geographic data concerning a position of a map element is used without change by adding a tag defined in the XML/SVG format.

3. A navigation system as defined in claim 2, wherein, when converting the geographic data to the XML/SVG format map data, information in the geographic data defining an administrative region is used without change by adding a tag defined in the XML/SVG format.

4. A navigation system as defined in claim 1, wherein the XML/SVG format map data based on administrative regions is layered in the order of a whole country as a highest level, a state or a county as an intermediate level, and a city as a lowest level.

5. A navigation system as defined in claim 4, wherein the XML/SVG format map data corresponding to the city as the administrative region is further divided into a first layer and a second layer where the first layer includes the map data for major roads in the city and the second layer includes the map data for minor roads and detailed places in the city.

6. A navigation system as defined in claim 1, wherein the XML/SVG format map data for each map element are linked to one another as a set so that the set of XML/SVG format map data is stored in a file and retrieved therefrom as a unit of the map element.

7. A navigation system as defined in claim 1, wherein data concerning a shape type of a map element is represented by the SVG format map data while data concerning a name, an address, and an ID number of the map element is represented by the XML format map data.

8. A navigation system as defined in claim 1, wherein the geographic data available in the market is GDF (Geographic Data File).

9. A method of converting map data, comprising the following steps of:
- retrieving a predetermined amount of geographic data available in the market;
- analyzing the retrieved geographic data; and
- converting the analyzed geographic data to XML (extensible markup language) and/or SVG (scalable vector graphics) format map data;
- wherein said step of converting the geographic data to the XML/SVG format map data includes a step of constructing the XML/SVG format map data in a layered structure based on administrative regions each being a unit of country, state, county, or city.

10. A method of converting map data as defined in claim 9, wherein said step of converting the geographic data to the XML/SVG format map data includes a step of using latitude/longitude information in the geographic data concerning a position of a map element without change by adding a tag defined in the XML/SVG format.

11. A method of converting map data as defined in claim 9, wherein said step of converting the geographic data to the XML/SVG format map data includes a step of using information in the geographic data defining an administrative region without change by adding a tag defined in the XML/SVG format.

12. A method of converting map data as defined in claim 9, wherein said step of constructing the XML/SVG format map data in the layered structure includes a step of constructing the map data in the order of a whole country as a highest level, a state or a county as an intermediate level, and a city as a lowest level.

13. A method of converting map data as defined in claim 12, wherein said step of constructing the XML/SVG format map data in the layered structure includes a step of constructing the map data corresponding to the city in a first layer and a second layer where the first layer includes the map data for major roads in the city while the second layer includes the map data for minor roads and detailed places in the city.

14. A method of converting map data as defined in claim 9, wherein the XML/SVG format map data for each map element are linked to one another as a set so that the set of XML/SVG format map data is stored in a file and retrieved therefrom as a unit of the map element.

15. A method of converting map data as defined in claim 9, wherein said step of converting the geographic data to the XML/SVG format map data includes a step of assigning data concerning a shape type of a map element to the SVG format map data and data concerning a name, an address, and an ID number of the map element to the XML format map data.

16. A method of converting map data as defined in claim 9, wherein the geographic data available in the market is GDF (Geographic Data File).

17. A map data delivery system for delivering map data to a user, comprising:
- a map data storage for storing XML (extensible markup language) and/or SVG (scalable vector graphics) format map data converted from geographic data available in the market;
- means for receiving a request from a remote user through a communication network; and
- means for retrieving the XML and/or SVG format map data as a unit of administrative region and delivering the retrieved map data for the administrative region to the user through a communication network;
- wherein the XML/SVG format map data is in a layered structure based on administrative regions each being a unit of country, state, county, or city.

18. A map data delivery system as defined in claim 17, wherein the XML/SVG format map data based on the administrative regions is layered in the order of a whole country as a highest level, a state or a county as an intermediate level, and a city as a lowest level.

* * * * *